United States Patent [19]
Ethier

[11] Patent Number: 5,982,741
[45] Date of Patent: Nov. 9, 1999

[54] METHOD AND APPARATUS FOR AUTOMATICALLY REDUCING CROSS-TALK BETWEEN WIRES COUPLED TO A COMMON NETWORK DEVICE

[75] Inventor: Steven L. Ethier, Pleasanton, Calif.

[73] Assignee: Tut Systems, Inc., Pleasant Hill, Calif.

[21] Appl. No.: 09/156,573

[22] Filed: Sep. 17, 1998

[51] Int. Cl.[6] .............................. H04J 1/12; H04J 3/10; H04J 15/00
[52] U.S. Cl. .......................................... 370/201; 370/389
[58] Field of Search .................................. 370/201, 286, 370/285, 289, 389, 392, 401, 402; 379/410, 416, 417; 178/69 A, 69 B; 381/13, 71.1, 83, 93, 94.1–94.9

[56] References Cited

U.S. PATENT DOCUMENTS

| | | | |
|---|---|---|---|
| 5,408,469 | 4/1995 | Opher et al. | 370/395 |
| 5,613,068 | 3/1997 | Gregg et al. | 395/200.13 |
| 5,689,644 | 11/1997 | Chou et al. | 395/200.06 |
| 5,745,702 | 4/1998 | Morozumi | 395/200.79 |

OTHER PUBLICATIONS

"TNETX–15AE Adress–Lookup Device", Texas Instruments Datasheets, pp.1–78, SPWS041A, Aug. 1997, revised Oct. 1997.

"TNETX3100—ThunderSWITCH™ 10–Port 10–/100–MBIT/S Ethernet™ Switch", Texas Instruments Datasheets, pp. 1–79, SPWS031D, Jun. 1997, revised Oct. 1997.

"TNETX3150/TNETX3150A ThunderSWITCH™ 15–Port 10–/100–MBIT/S Ethernet™–0 Switch", Texas Instruments Database, pp. 1–112, SPWS027F. Feb. 1997, revised Sep. 1997.

*Primary Examiner*—Ajit Patel
*Attorney, Agent, or Firm*—Blakely, Sokoloff, Taylor & Zafman LLP

[57] ABSTRACT

A method of adjusting the sensitivity of a receiver requires the association of a network address of a remote network device, such as a computer, with a first port of a multiport network device, such as a switch. The reception of the network address of the remote network device at a second port of the multiport network device indicates the possible occurrence of a cross-talk condition between networks coupled to the first and second ports. Accordingly, the sensitivity of a receiver associated with the second port is reduced in an attempt to reduce the sensitivity thereof to a point at which cross-talk signals, generated as a result of the cross-talk condition between networks coupled to the first and second ports, are no longer detected. The sensitivity of the receiver may be reduced by increasing a noise threshold level below which signals are not detected.

40 Claims, 8 Drawing Sheets

METHOD AND APPARATUS FOR AUTOMATICALLY REDUCING CROSS-TALK BETWEEN WIRES COUPLED TO A COMMON NETWORK DEVICE

FIELD OF THE INVENTION

The present invention relates generally to the field of network communications and, more specifically, to reduction of cross-talk between wires of separate networks coupled to respective ports of a multiport network device.

BACKGROUND OF THE INVENTION

In a typical network environment, a switch may be utilized to facilitate communications between various segments of a single network, or between distinct and separate networks, in an intelligent and accordingly efficient manner. Specifically, a switch may in time learn the network addresses of the various network devices on network segments, or distinct networks, coupled to the respective ports of the switch by respective wires. Such wires may include copper wires in the form of twisted-pair wires or co-axial cables. The wires may furthermore be classified as comprising Category 1–5 wiring according to the EIA/TIA 568 specification. By examining each packet received at the switch, the switch is able to make a determination as to whether the received packet should be propagated out of a particular port, and over a particular segment or network, based on the destination address information associated with the received packet.

Figure 1:
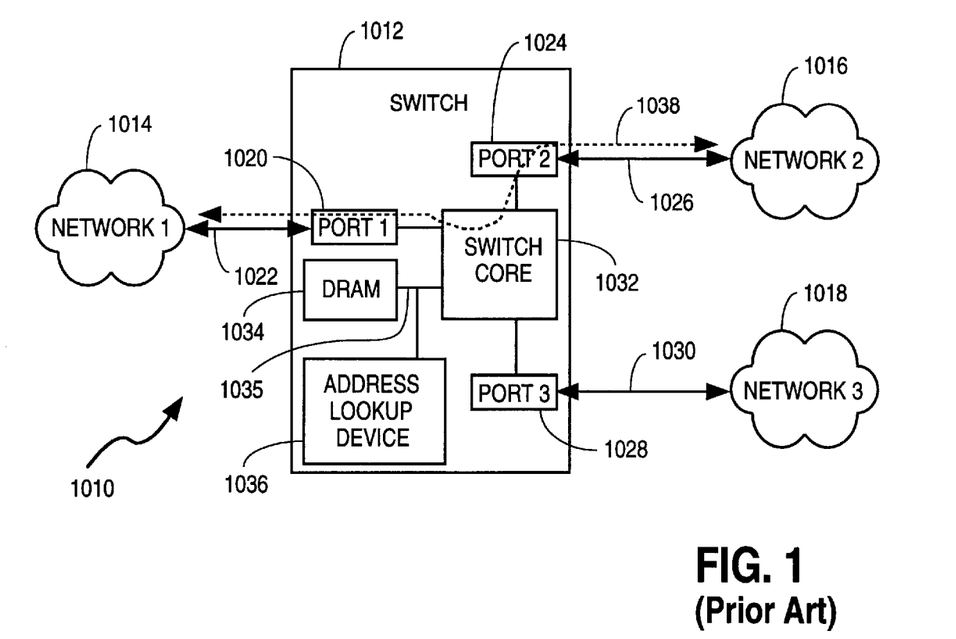
FIGS. 1 and 2 are block diagrams indicating exemplary packet switching environments.

FIG. 1 illustrates an exemplary packet switching environment 1010 in which packet communication between three distinct networks, namely networks 1014, 1016, and 1018, is facilitated by a switch 1012. Of course, the switch 1012 to may include any number of ports, and made thus couple any number of networks. The network 1014 is coupled to a port 1020 of the switch 1012 by a wire 1022, the network 1016 is coupled to a port 1024 by a wire 1026, and the network 1018 is coupled to the port 1028 by the wire 1030. Each of the ports 1020, 1024 and 1028 is coupled to a switch core 1032 (also known as a "switch fabric") through which packets are propagated or routed between the ports. The switch core 1032 is shown to be coupled to a memory resource in the form of a Dynamic Random Access Memory (DRAM) 1034, which provides a buffer resource to the switch core 1032. All valid packets received at the switch core 1032 are propagated to the DRAM 1034 on a bus 1035 coupling the DRAM 1034 and the switch core 1032. An address lookup device 1036 is shown to snoop the bus 1035 for the purpose of learning address information, and constructing an address lookup table mapping network device addresses to ports of the switch 1012.

Figure 2:
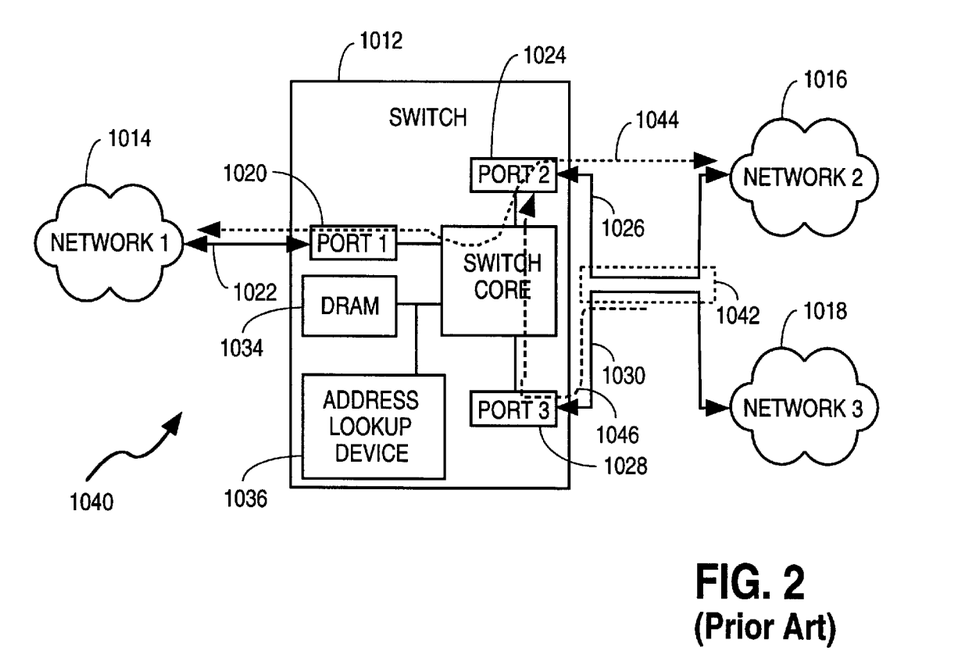

In the packet switching environment 1010 illustrated in FIG. 1, the wires 1026 and 1030 are shown to be physically distant from each other. Accordingly, a packet transmission 1038 between the networks 1014 and 1016 may occur without generating any cross-talk on the wire 1030. FIG. 2, on the other hand, illustrates an alternate packet switching environment 1040 in which the wires 1026 and 1030 are bundled together in a common cable 1342. In such a situation, so-called "near end" cross-talk (or signal leakage) may occur between the wires 1026 and 1030. The cross-talk is most likely to occur in close proximity to the ports 1024 and 1028 when a packet is being transmitted from one of these ports, while the other is listening on its respective wire. Consider, for example, the transmission of a packet from the network 1014 to the network 1016, as indicated at 1044. As the packet is transmitted from the port 1024, the signal strength is at a maximum. As the wire 1026 is brought into close proximity with the wire 1030 while propagating a high-powered transmit signal, there is a possibility that a cross-talk signal may be generated, as indicated at 1046, on the wire 1030. A receiver of the port 1028 may be in a state of maximum sensitivity for the purposes of reception, and accordingly the cross-talk signal may be received at the port 1028, and routed to the switch core 1032. As the address lookup device 1036 may have previously learned the source address of a packet, embodied by the cross-talk signal, as being associated with a device on the network 1014, an incorrect modification to an address lookup table may occur. Specifically, the address lookup device 1036 may indicate the source address of the cross-talk signal as belonging to a device on the network 1018. This may in turn result in packet switching errors.

The above identified problem discussed with reference to FIG. 2 may be exacerbated when the wires 1026 and 1030 are not well insulated. For example, where the wires 1026 and 1030 comprise Unshielded Twisted Pair (UTP) wires of Category 1, the possibility for the generation of cross-talk signals may be increased. Further, in certain networking environments, the frequency and power levels of transmit signals may increase susceptibility of the network to wire cross-talk.

SUMMARY OF THE INVENTION

According to the invention, there is provided a method of adjusting the sensitivity of a receiver. Upon detecting the reception of a network address, identifying a remote network device, on a port of a multiport network device, a determination is made as to whether the network address is associated with a further port of the multiport network device. If so, the sensitivity of a receiver, associated with the port, is automatically adjusted from a first level of sensitivity to a second level of sensitivity.

Other features of the present invention will be apparent from the company drawings and from the detailed description that follows.

BRIEF DESCRIPTION OF THE DRAWINGS

The present invention is illustrated by way of example, and not limitation, in the figures of the accompanying drawings in which like references indicate similar elements.

DETAILED DESCRIPTION

A method and apparatus for adjusting the sensitivity of a receiver utilized for the reception of data transmissions within a communications network are described. In the following description, for the purposes of explanation, numerous specific details are set forth to provide a thorough understanding of the present invention. It will be evident, however, to one skill in the art that the present invention may be practiced without these specific details.

Figure 3:
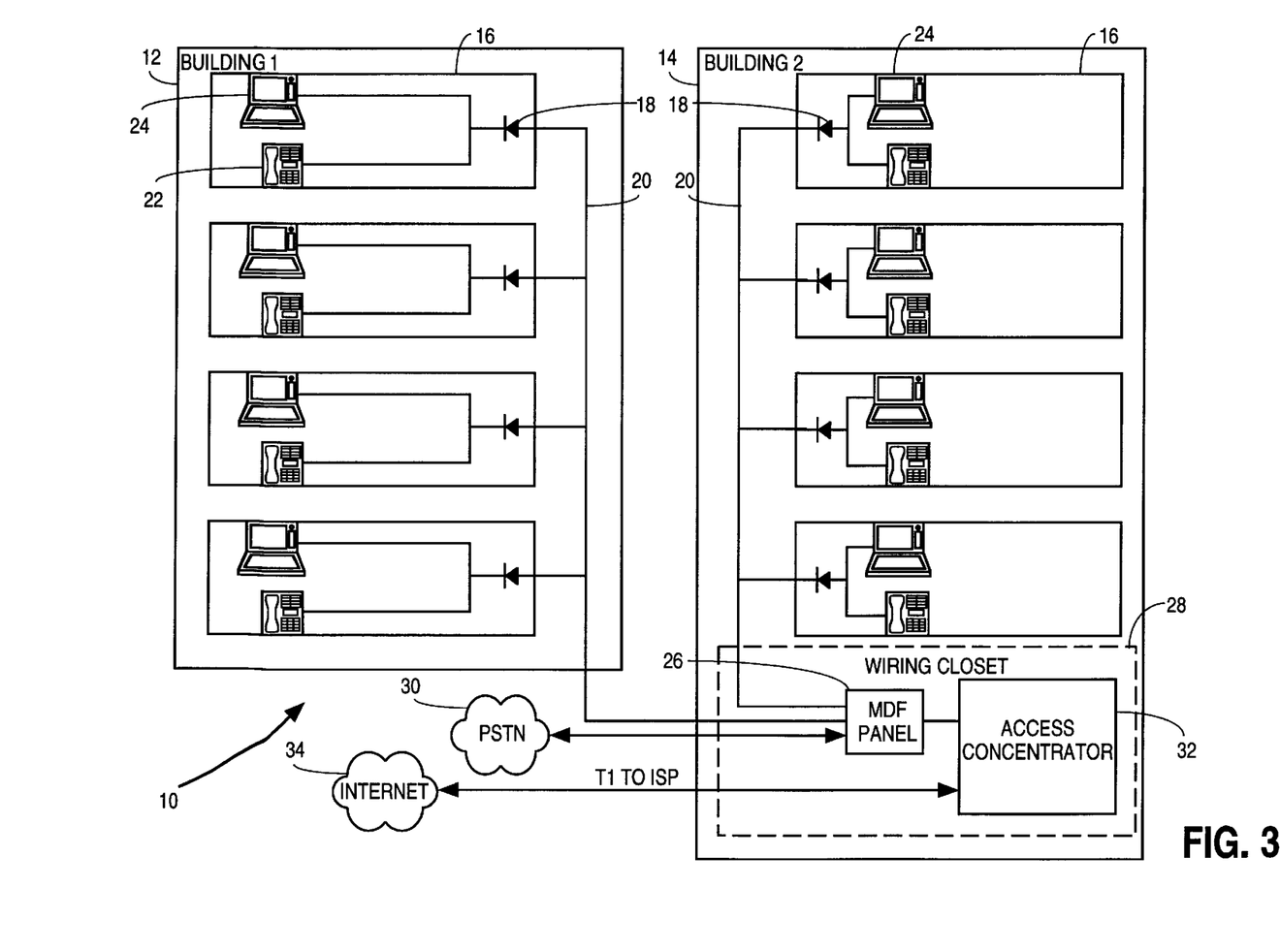
FIG. 3 is a diagrammatic representation of a multi-dwelling unit (MDU) within which the present invention may be employed.

FIG. 3 is a diagrammatic representation of a multi-dwelling unit (MDU) 10 within which the present invention may be employed. The MDU 10 is shown to include two buildings 12 and 14, and each of the buildings 12 and 14 is shown to include a number of units 16, which may be apartments, hotel rooms, offices, or booths. The units 16 may be located on multiple floors within each of the buildings 12 and 14. The MDU 10 may be a high-rise apartment complex, garden-style apartment complex, hotel, or any other structure that includes discrete residential accommodations. The present invention may also be employed within office complexes, factories, exhibit halls or any other environment within which two or more devices may require networking.

Each unit 16 is shown to include a network connection, in the exemplary form of a RJ-11 socket 18, that is coupled to a carrier medium, in the exemplary form of Plain Old Telephone Service (POTS) wiring 20 that comprises a bundle of wire pairs. The wiring 20 may include Unshielded Twisted Pair (UTP) wiring utilized to establish a telephone connection network throughout the buildings 12 or 14. In this case, the wiring 20 may be Category 1 or Category 2 wiring, as defined by the EIA/TIA 568 specification. The wiring 20 may further comprise a number of wire pairs, each pair being for a specific unit 16, which are bundled together as a single cable within a sheath. Within each unit 16, a regular telephone unit 22 and a computer 24 (via a Network Interface Card (NIC), modem, or other adapter) are shown to the coupled to the wiring 20 via a respective RJ-11 socket 18. The wiring 20 within each of the buildings 12 and 14 is shown to be coupled to a Main Distribution Frame (MDF) panel 26 within a wiring closet 28 of the building 14. The MDF panel 26 couples the wiring 20 to the Public Switched Telephone Network (PSTN) 30. The MDF panel 26 is also shown to be coupled to an access concentrator 32, which is constructed according to the teachings of the present invention, to provide access to the Internet 34 to devices coupled to the wiring 20, such as the illustrated computers 24. While the present invention is described below within the context of a network implemented utilizing POTS wiring 20 as a carrier medium, it will readily be appreciated that the teachings of the present invention may be implemented within any network environment within which switching occurs, such as a network utilizing a carrier medium that supports higher transmission rates, such as for example Category 5 cabling in the form of four-wise twisted-pair cables that can transmit data at 100 Mbps to support technologies such as Ethernet or Asynchronous Transfer Mode (ATM).

Figure 4:
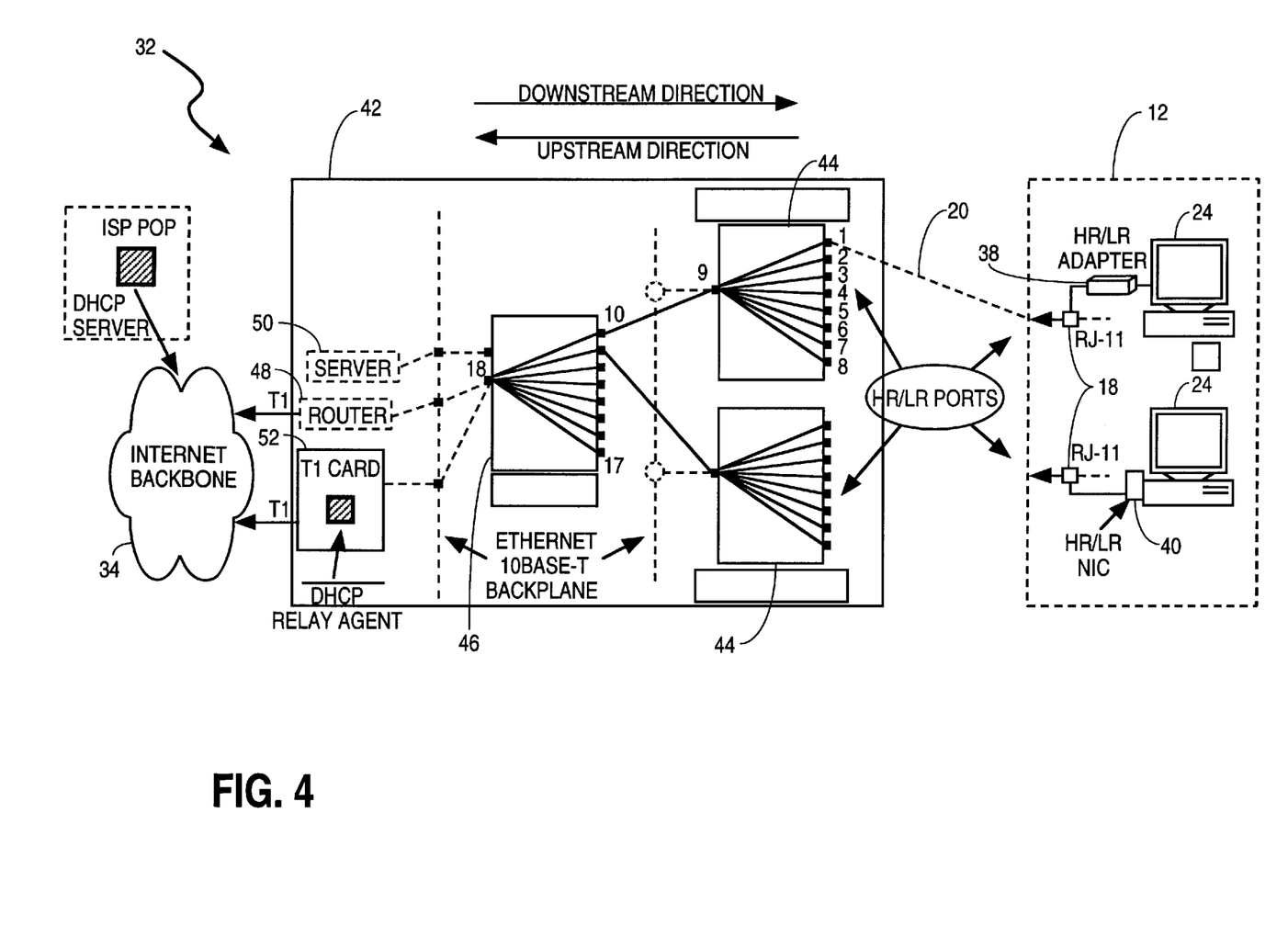
FIG. 4 is a diagrammatic representation of an access concentrator, according to an exemplary embodiment of the present invention.

FIG. 4 is a diagrammatic representation of the access concentrator 32, illustrating further details regarding the construction of this unit. A first computer 24 within the building 12 is shown to be coupled via an external adapter 38 to a respective RJ-11 socket, the adapter 38 including a physical layer device (PHY) that enables reliable network communication over the POTS wiring 20. In one exemplary embodiment, the adapter 38 is the HomeRun adapter developed by Tut Systems, Inc. of Pleasant Hill, Calif. A second computer 24 is shown to include an internal Network Interface Card (NIC) 40 that similarly includes a physical layer device (PHY) for facilitating communication over the POTS wiring 20. Turning specifically to the access concentrator 32, a chassis or shelf 42 accommodates a series of line cards 44 that are coupled to a multiplexer (MUX) card 46. The chassis 42 includes 17 slots into which line cards 44 may be inserted. In one basic configuration, a collection of eight line cards 44 are coupled to a single MUX card 46 by a 10BaseT connection. The MUX card 46 may concentrate up to sixty-four 1 Mbps LANs coupled to respective ports of the line cards 44 into an aggregate 10 Mbps or 100 Mbps LAN. The aggregate LAN may be connected to a local router 48, local server 50, or to a Wide Area Network (WAN) via a T1 WAN card 52.

Figure 5:
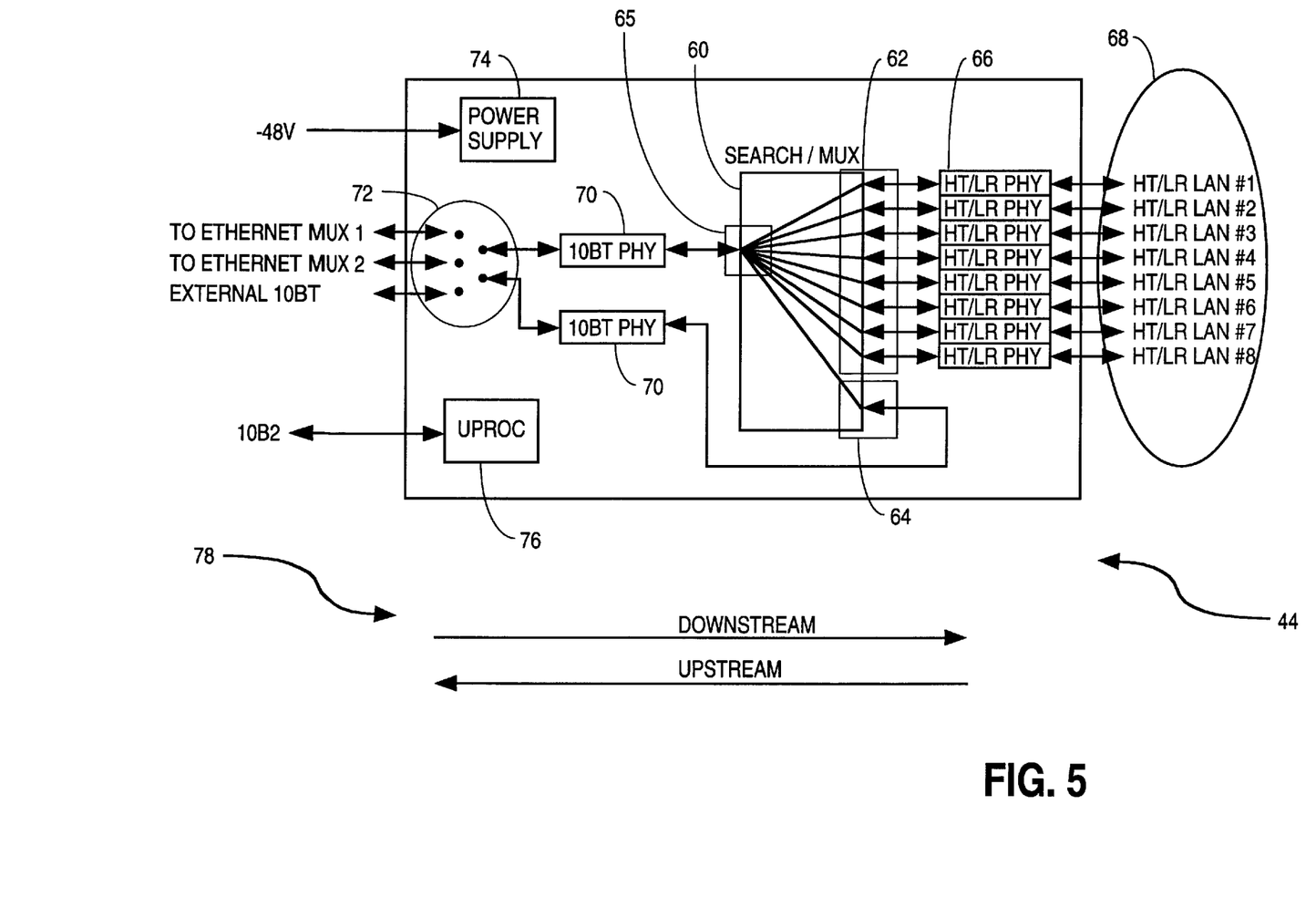
FIG. 5 is a block diagram showing structural details of a line card, according to an exemplary embodiment of the present invention.

FIG. 5 is a block diagram illustrating further structural details of a line card 44, according to an exemplary embodiment of the present invention. The line card 44 includes a switch 60, which may be an Ethernet switch based on a Texas Instruments TNETX3100 switch. The switch 60 may provide eight 10 Mbps ports and two 10/100 Mbps ports. The switch 60 further has a direct interface between each port 62 and a physical layer device (PHY) 66. In one exemplary embodiment of the present invention, the PHYs 66 may be HomeRun PHYs, developed by Tut Systems, Inc. for facilitating communication server POTS wiring. The PHYs 66 may also be conventional Ethernet PHYs, depending on the carrier medium of networks supported by the various ports of the switch 60. Eight of the ports 62 are shown to be coupled via the physical layer devices 66 to respective LANs 68. In one embodiment, a LAN 68 may be implemented in each of the units 16 illustrated in FIG. 3 utilizing the POTS wiring 20. In this case, the twisted-pair wiring from each of the units 16 will be coupled to a respective PHY. Two of the ports 64 and 65 are shown to be coupled to respective 10BaseT PHYs 70. Conveniently, the ports 62 and 64 may be labeled "downstream" ports, and the port 65 labeled an "upstream" port. The port 64 allows the line card 44 to be daisy chained to further line cards 44, while the port 65 is regarded as an "output" port. As illustrated at 72, the ports 64 and 65 may optionally be coupled to a further line card, a MUX card, or to an external 10BaseT port. The line card 44 is also shown to include a power supply 74 and a microprocessor 76.

In a MDU 10, such as that illustrated in FIG. 3, the users on the LANs 68 (coupled to each of the ports 62 of the switch 60) are typically individual users with no affiliation to users coupled to the other LANs 68. This may create security issues, in that a user on a LAN may conceivably be able to snoop network traffic transmitted from and to a user on another LAN 68 coupled to the switch 60. Further, it is conceivable that a user on a first LAN 68 would be able to set up a web server, that could be accessed by users of the other LANs, without utilizing the services of an Internet Service Provider (ISP). This may be undesirable in certain situations. For data security purposes, it is desirable that a user coupled to any one of the LANs 68 not see traffic transmitted to and from users connected to other LANs 68. Further, data transmissions should be secured in both directions (i.e., the upstream and the downstream directions indicated by the arrows at 78).

Figure 6:
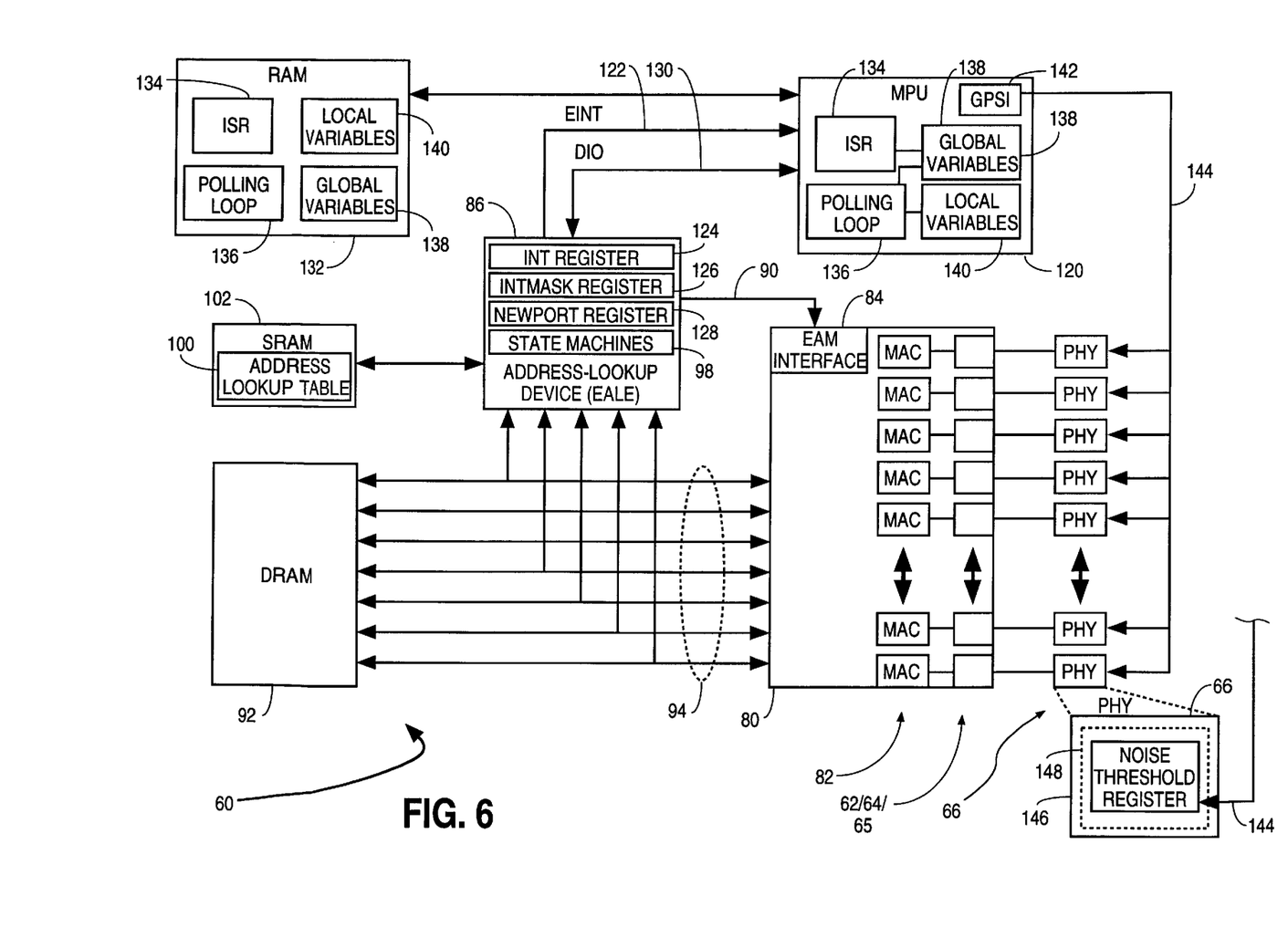
FIG. 6 is a block diagram illustrating a switch, according to an exemplary embodiment of the present invention.

FIG. 6 is a block diagram illustrating an exemplary implementation of the switch 60, shown in FIG. 5. A switch core 80 (a.k.a. a switching fabric) is shown to include the ports 62, 64 and 65, an array of corresponding Media Access Control (MAC) ports 82 and an External Address Match (EAM) interface 84. An external physical layer device (PHY) 66 is coupled to each port. Each of the PHYs 66 may be a 10BaseT PHY, or a specialized PHY to facilitate communications over POTS wiring 20. In one exemplary embodiment, such a specialized PHY may comprise the HomeRun PHY, developed by Tut Systems, Inc. of Pleasant Hill, Calif. The switch core 80 also includes a data path, switching logic, internal single-address compare, and network statistics logic (all not shown).

The switch core 80 may support both cut-through routing, that enables transmission on a destination port before complete reception of a packet and store-and-forward routing, that requires that the entire packet be received before it is propagated to a destination port. Cut-throughout routing reduces overall switch latency, while store-and-forward routing provides the ability to filter frames that contain errors.

Three packet-forwarding modes are also implemented by the switch core 80, namely an internal single-address compare mode, an external address match (EAM) mode and a frame-taking mode. The EAM interface 84 facilitates the support of multiple addresses per port, as opposed to the single-address mode compare that only supports a single address the port. Accordingly, to support multiple users on a LAN 68 coupled to each port 62/64/65, switching logic in the form of an address-lookup device 86 provides an input, in the form of a port-indicating (EAM) signal 90 to the EAM interface 84 of the switch core 80. The EAM signal 90 is a multiple-bit signal (e.g., a 16-bit signal EAM [0 . . . 15]) that indicates to the switch core 80 to which port(s) a packet should be forwarded within the switch. The EAM signal 90 may also indicate whether the switch core 80 is to implement the single-address compare. For example, EAM [15] may be either set or reset to select between the single-address compare or the external address match modes. In the event that EAM [15] is reset (i.e., low), the external address match mode is implemented, and EAM [0 . . . 14] represents a mask of the ports to which the packet is forwarded. For example, if the packet if is to be forwarded to ports 00, 07 and 14, the EAM signal 90 would be "1000000010000001".

A memory resource in the form of a Dynamic Random Access Memory (DRAM) 92 is coupled to the switch core 80 by a DRAM bus 94. The DRAM 92 implements a packet buffer, and enables the switch core 80 to support both single-access operation and page-burst-access operation. Specifically, all valid packets are passed by the DRAM bus 94 to be DRAM 92. The address-lookup device 86 is shown to be coupled to the DRAM bus 94, and actively snoops the DRAM bus 94 to implement the external address matching functionality of the switch 60. The address-lookup device 86 captures the destination address of a packet placed on the DRAM bus 94 by the switch core 80 for the purpose of generating the EAM signal 90. In an exemplary embodiment of the present invention the device 86 comprises the TNETX15AE address-lookup device manufactured by Texas Instruments of Dallas, Tex. The address lookup device 86 implements a number of state machines 98 (e.g., lookup, delete, add, find and age state machines) to manage and maintain an address lookup table 100 in an associated external Static Random Access Memory (SRAM) 102. The address lookup table 100 maps the source addresses (e.g., MAC addresses) of packets received at the switch 60 to ports 62/64/65 of the switch 60 on which the respective packets received, as determined by the address lookup device 86.

The process of constructing the address lookup table 100 is referred to as the "learning" of addresses by the switch 60. Once an address/port record has been created in the address lookup table 100, the switch 60 is able to make a determination as to which port a packet having a "learned" destination address should be routed. In one embodiment, address lookup device 86 may be coupled to an EEPROM (not shown) that stores a sequence of initialization codes that allow the address lookup device 86 to be auto-configured. In an alternative embodiment, the initialization data may be downloaded from a microprocessor 120 coupled to the address lookup device 86.

As mentioned above, all valid packets received at the switch 60 are passed across the DRAM bus 94. The switch core 80 may write data to the DRAM 92 in a specific format that is recognized by the address lookup device 86 to determine the correct destination and source address of the packet. The address lookup device 86 is able to detect the start of a new packet from flag byte information included in the packet transmission. For example, a row-address strobe signal (DRAS) and a column-address strobe signal (DCAS) may be utilized to identify the position of a forward pointer, a top level of a flag byte, and whether the nibble contains the start of a frame code. Data bit 35 may be de-asserted (i.e., set to 0) to denote the start of a packet. On the first word transmit on the DRAM bus 94, data bits 27–24 of a line may indicate an active port number, and the column-address strobe signal may also be used identify the presence of destination and source address data on the DRAM bus 94. Accordingly, in one exemplary embodiment, to determine the start of a frame, the address lookup device 86 tests data bit 35 of a forward pointer, and decodes the first flag nibble placed on the DRAM bus 94. In this case, data bit 35 should be zero, indicating a valid packets start as opposed to a link buffer transfer. Using the column-address strobe, the destination address and the source address of the packet are extracted for external processing by the address lookup device 86. The address lookup device 86 then performs a lookup cycle by accessing the address lookup table 100, chooses an appropriate EAM code to be outputted to the EAM interface 84 of the switch core 80 and then outputs this EAM code. Further details regarding the snoop procedure are provided in the published data sheets for the TNETX3100 Ethernet switch and the TNETX15AE address lookup device from Texas Instruments.

The address lookup device 86 implements interrupts to indicate changes to the address lookup table 100. Specifically, interrupts are generated by the address lookup device 86 to indicate when a new address is added to the table 100 (i.e. a NEW interrupt), when an address changes ports (i.e., a CHANGE interrupt), when an address changed ports and is secure, and when an address is deleted by an aging process. To indicate an interrupt to an external device, such as a microprocessor 120, the address lookup device 86 asserts an interrupt signal 122 (e.g., the EINT signal). The address lookup device 86 further includes an interrupt register 124, an interrupt mask register 126, and a new port register 128. The interrupt register 124 is accessible and readable at all times by an external device, and contains information concerning all current interrupts. The interrupt mask register 126 facilitates the masking of interrupts, by only allowing the interrupt signal 122 to be asserted if an interrupt condition corresponding to a mask value stored therein occurs. For example, the interrupt signal 122 may only be asserted if there is a one-to-one correspondence between bits stored in the interrupt register 124 and the interrupt mask register 126. In the event of a NEW or CHANGE interrupt, the identification of the new port with which the address is associated is provided in the new port register 128. The contents of the registers 124, 126 and 128 are accessible by an external device, such as the microprocessor 120, via a data input/output (DIO) bus 130.

The microprocessor 120 is shown to be coupled to an associated memory, such as a Random Access Memory (RAM) 132, which stores an Interrupt Service Routine (ISR) 134, a polling loop 136, a set of global variables 138, and a set of local variables 140. The microprocessor 120 is able to access and execute the sequences of instructions that comprises the ISR 134 and the polling loop 136, which are accordingly shown to reside fully or at least partially, within the local memory (e.g., cache memory) of the microprocessor 120. The global variables 138 and the local variables 140 are similarly shown to be capable of residing within registers within the microprocessor unit 120. The logic and functionality of the present invention may however reside in software, hardware, or any combination thereof. For the purposes of the present specification, the term "machine-readable medium" shall be taken to include any memory resource (e.g., the RAM 132), both internal and external to a machine, that is capable of storing a sequence of instructions that may be executed by a machine (e.g., the microprocessor 120) and that cause the machine to perform the substance of any one of the functions specified in the current specification. Accordingly, the term "machine-readable medium" shall be taken to include, but not be limited to, solid-state memories, magnetic memories, optical memories, chemical memories, or carrier-wave signals.

The microprocessor unit 120 is also shown to include a General Purpose Serial Interface (GPSI) 142 via which the microprocessor 120 is able to propagate data to any one of the PHYs 66, and via which data can be transmitted from the PHYs 66 to the microprocessor 120 over the connection 144. In one exemplary embodiment of the present invention, each of the PHYs 66 operates in a slave mode, and the microprocessor unit 120 is accordingly able to control operation of the PHYs 66 via the GPSI 142. Each of the PHYs 66 supports a variety of control and status registers. Specifically, each PHY 66 includes a noise threshold register 146, which is implemented within a noise follower 148 within a receiver of the PHY 66.

Figure 7:
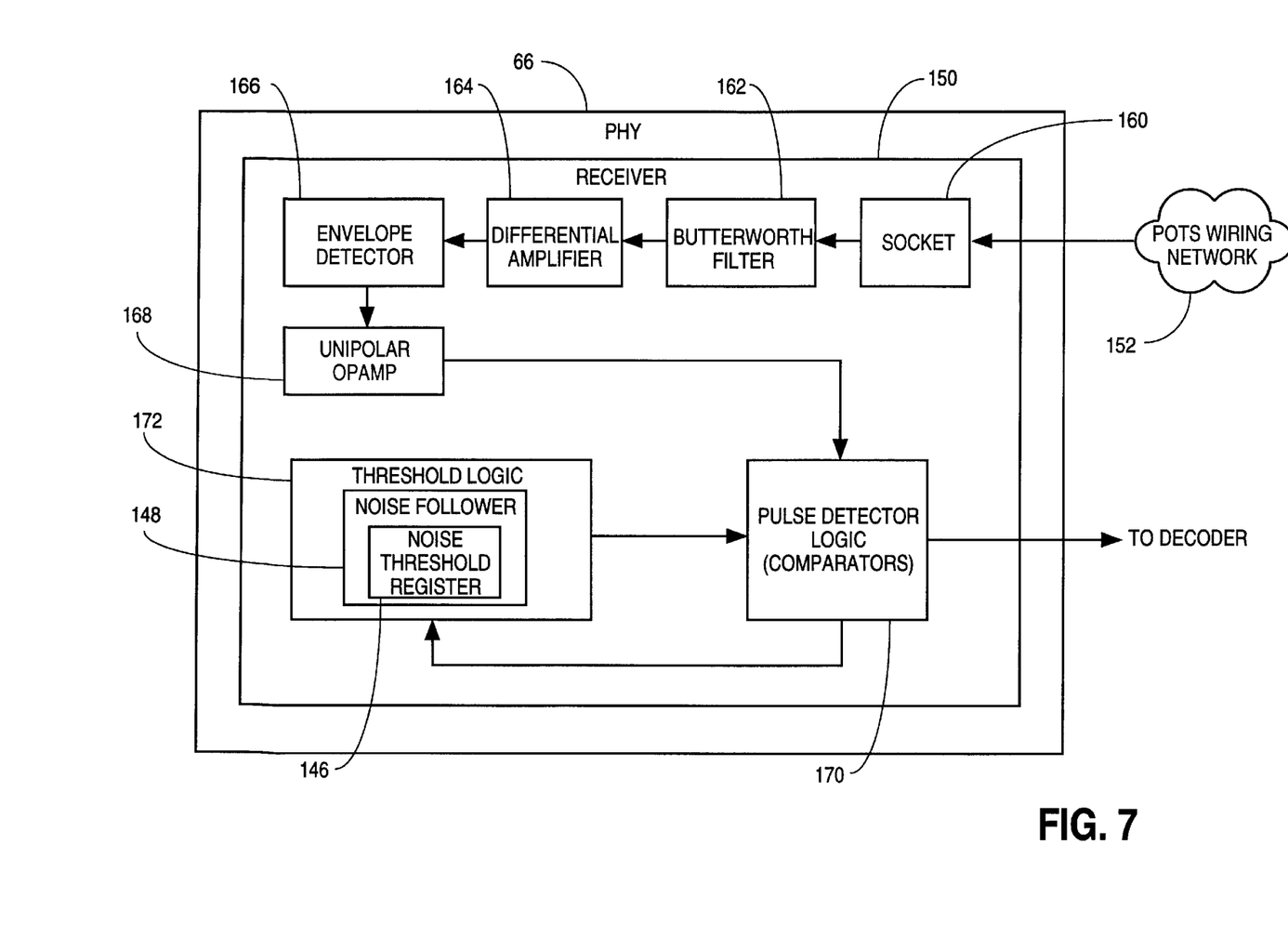
FIG. 7 is a block diagram illustrating the structural details of a receiver, according to an exemplary embodiment of the present invention, that may be incorporated within a physical-layer device.

FIG. 7 is a block diagram illustrating further structural details of an exemplary receiver 150 that may be incorporated within each of the PHYs 66. The receiver 150 is shown to include a socket 160 receiving a jack coupling the receiver 150 to a POTS wiring network 152. A multi-cycle waveform, comprising a received signal, is propagated from the socket 160 to a Butterworth filter 162, which implements a spectral mask limiting the bandwidth of the received signal to between 5.5 and 9.5 MHz. The filtered signal is then propagated from the Butterworth filter 162 to a differential amplifier 164, and then onto an envelope detector 166 that outputs an envelope signal derived from the amplified and filtered received signal. This envelope signal is then fed through a unipolar operational amplifier (opamp) 168, from where it is delivered to pulse detector logic 170, which is illustrated to send and receive signals from threshold logic 172. Specifically, the threshold logic 172 propagates analog signals to the pulse detector logic 170 that indicates a noise threshold level to comparators included within the pulse detector logic 170. To this end, the threshold logic 172 includes a noise follower 148, which implements a noise threshold level state machine, and includes the noise threshold register 146. The noise threshold register 146 stores a 8-bit sequence, that may be incremented or decrement by, inter alia, the noise threshold level state machine. The 8-bit sequence is propagated to a digital-to-analog converter, which transforms the 8-bit sequence into an analog signal that indicates the noise threshold level to the comparators of the pulse detector logic 170. The output of the pulse detector logic 170 is then propagated to a decoder within the PHY 66. Referring back to FIG. 6, the microprocessor 120 is shown to be able to increment the 8-bit sequence stored in the noise threshold register 146 via the connection 144.

Figure 8:
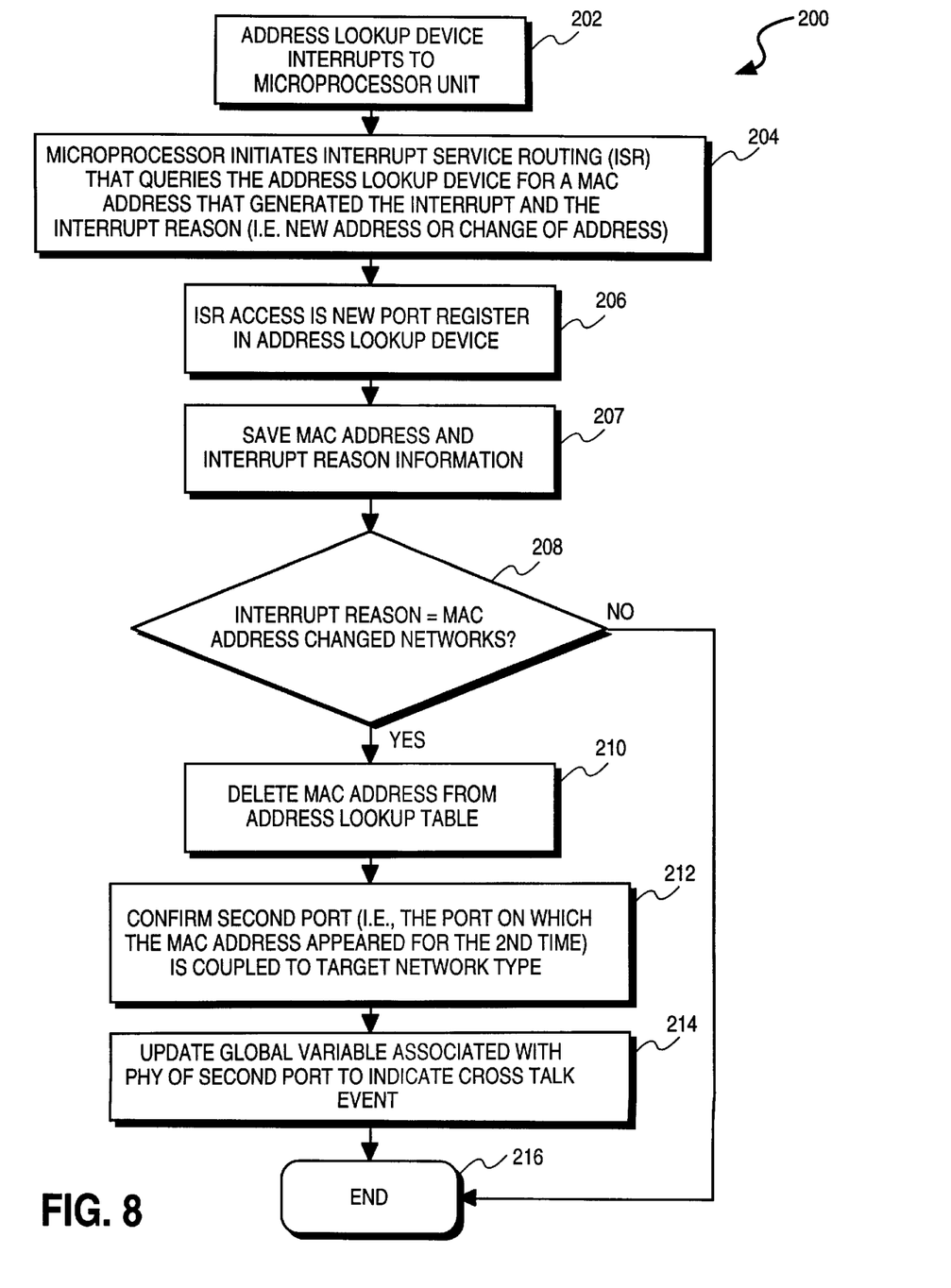
FIG. 8 is a flowchart illustrating a method, according to an exemplary embodiment of the present invention, of initiating and implementing an interrupt service routine (ISR) that identifies ports on which a cross-talk condition has been detected.

Operation of the exemplary switch 60 shown in FIG. 6 will now be described with reference to the flowcharts to shown in FIGS. 8 and 9. Specifically, FIG. 8 is a flowchart illustrating a method 200, according to an exemplary embodiment of the present invention, of initiating and implementing the ISR 134. The method 200 commences at step 202, where the address lookup device 86 interrupts the microprocessor 120 by asserting the interrupt signal 122. In one exemplary embodiment, the interrupt mask register 126 is configured so that only NEW or CHANGE interrupts cause the interrupt signal 122 to be asserted. It will be appreciated that a CHANGE interrupt will be generated in the situation described above with reference to FIG. 2, in which a cross-talk signal is received at the port 102B, the source address of a packet embodied within this cross-talk signal previously having been associated with another port, such as the port 102D. In response to the assertion of the interrupt signal at step 202, the microprocessor 120 initiates the ISR 134 at step 204. The ISR 134 queries the address lookup device 86 for the relevant MAC address that generated the interrupt and for the interrupt reason (i.e., whether a new address has been detected or whether a change of address has been detected). This information is provided in the interrupt register 124 that is accessible by the microprocessor 120. At step 206, the ISR 134 accesses the new port register 128 of the address lookup device 86. The ISR 134 is accordingly able to identify the new port 62/64/65 with which a Media Access Control (MAC) address is to be identified (e.g., the port 102B). At step 207, the ISR 134 stores the relevant MAC address and the determined interrupt reason information.

At decision box 208, the ISR 134 makes a determination as to whether the interrupt was generated as a result of a known MAC address appearing on a new port (and therefore on a new network) or whether the interrupt was generated as a result of an unknown MAC address appearing on a port. In the event that the interrupt was generated as a result of a known MAC address appearing on a new port (i.e., a CHANGE interrupt was generated), the method 200 proceeds to step 210, where the ISR 134 deletes the relevant MAC address from the address lookup table 100. Specifically, as a communication path becomes inoperative when a MAC address changes port, the step of deleting the MAC address preempts the MAC address being deleted by an aging process. The communication path may thus possibly be reestablished before an upper layer protocol can terminate the relevant connection. At step 212, the ISR 134 confirms that the new port on which the MAC address was seen is coupled to a predetermined network type. Specifically, the ISR 134 is able to identify the new port utilizing the content of the new port register 128. The ISR 134 may further have access to a port/network type mapping, according to which the ISR 34 is able to identify the network type associated with the new port. In one exemplary embodiment, the ISR 134 may determine whether the new port is coupled to a HomeRun Local Area Network (LAN), operating according to the protocols developed by Tut Systems, Inc., or the like. At step 214, the ISR 134 updates a global variable 138 associated with the PHY 66 of the new port to indicate that a cross-talk event has occurred with respect to the new port. For example, a respective global variable may be set to a logical one (1) to indicate the cross-talk event. The method 200 then terminates at step 216. Accordingly, it will be appreciated that the method 200 is interrupt driven.

Figure 9:
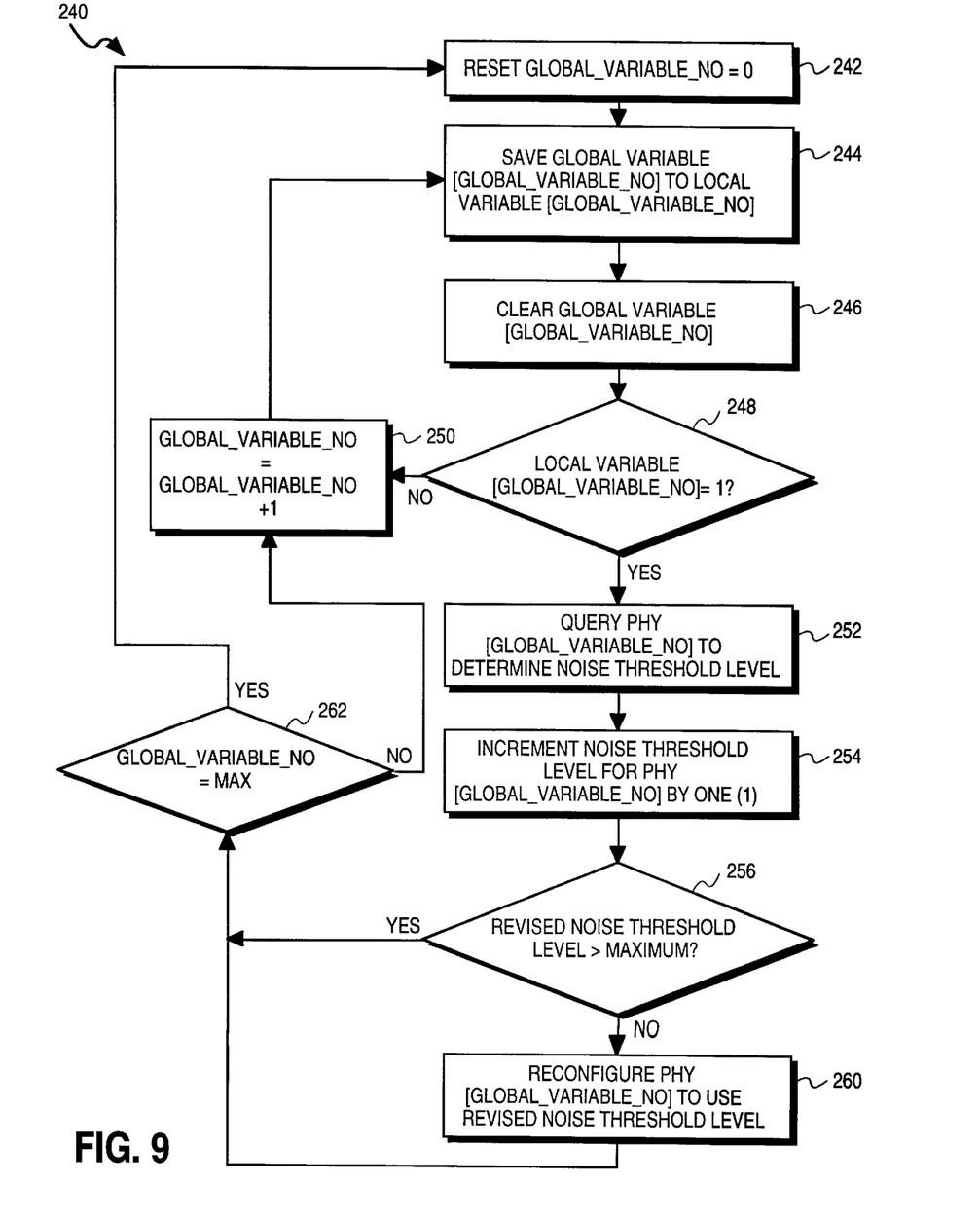
FIG. 9 is a flowchart illustrating a method, according to an exemplary embodiment of the present invention, of implementing a polling loop that adjusts the level of sensitivity of a receiver.

Turning now to FIG. 9, a flowchart illustrating a method 240, according to exemplary embodiment of the present invention, of implementing the polling loop 136 is shown. The method 240 operates in a continual loop, and is not interrupt driven. The method 240 commences at step 242, where a number variable, having a maximum value equal to the number of ports (and accordingly PHYs) within the switch 60, is reset to zero (0). At step 244, a global variable under consideration is copied to an associated local variable, and the relevant global variable is cleared at step 246. At step 248 a determination is made as to whether a local variable under consideration is set to a logical one, and accordingly indicates that an associated port received a cross-talk signal, and that a network or line coupled to the port experienced a cross-talk condition. If not, the number variable is incremented by one at step 250, so that a next successive global variable and local variable, associated with a further port and PHY, will be processed and considered during a subsequent iteration of steps 244–248. Alternatively, should the relevant local variable the set to a logical one (1), the polling loop 136 queries the associated PHY 66 at step 252 to determine the noise threshold level thereof, as indicated by content of noise threshold register 146 of the PHY 66. At step 254, the noise threshold level for the PHY 66 is incremented by a predetermined increment (e.g., 10 mV) to thereby decrease the sensitivity of the receiver within which the PHY 66 is incorporated. Specifically, the microprocessor 120 may output a serial signal on the connection 144, which is received by the noise follower 148, and results in the 8-bit sequence, stored in the noise threshold register 146, being incremented by a predetermined amount. Accordingly, the noise threshold level propagated to the comparators of the pulse detected logic 70 is increased. By increasing the noise threshold level, and decreasing the sensitivity, of the PHY 66, the polling loop 136 seeks to render the PHY 66 less susceptible to detecting cross-talk signals, which typically have a lower voltage amplitude than valid signals. At decision box 256, a determination is made as to whether the revised noise threshold level of the PHY 66 is greater than a predetermined maximum noise threshold level. If so, the relevant PHY 66 is not reconfigured to implement the revised noise threshold level, and the method proceeds directly to decision box 262. Alternatively, the PHY 66 under consideration is reconfigured to utilize the revised noise threshold level at step 260. A determination is then made at decision box 262 whether the number variable, indicating any one of the PHYs of the switch 60, has reached a predetermined maximum number (i.e., the total number of PHYs included within the switch 60). If so, the variable number is then again reset at step 242 and the method 240 performs another iteration. If not, the variable number is incremented by one, and the next iteration begins at step 244.

In summary, the present invention proposes detecting a cross-talk condition when a network address appears on a port of a multi-port network device that would not, under normal operating conditions, be receiving packets with the relevant network address. The present invention seeks to address the cross-talk condition by dynamically decreasing the sensitivity of a receiver of a port for a network or line on which the cross-talk condition occurred.

Accordingly, a method and an apparatus for dynamically adjusting the sensitivity of a receiver to reduce cross-talk conditions have been described. Although the present invention has been described with reference to specific exemplary embodiments, it will be evident that various modifications and changes may be made to these embodiments without departing from the broader scope and spirit of the invention. Accordingly, the specification and drawings are to be regarded in an illustrative rather than restrictive sense.

What is claimed is:

1. A method of adjusting the sensitivity of a receiver, the method including the steps of:

associating a network address of a remote network device with a first port of a multiport network device;

detecting reception of the network address on a second port of the multiport network device; and automatically adjusting the sensitivity of a receiver, associated with the second port, from a first level of sensitivity to a second level of sensitivity responsive to the reception of the network address on the second port.

2. The method of claim 1 wherein the step of automatically adjusting the sensitivity includes the step of automatically raising a noise threshold level by a predetermined increment to decrease the sensitivity of the receiver.

3. The method of claim 1 including the steps of determining whether the second level of sensitivity of the receiver exceeds a minimum sensitivity level and, if so, then retaining the first level of sensitivity for the receiver.

4. The method of claim 1 wherein the step of associating includes the step of constructing an address lookup table that records the association between the first port and the network address.

5. The method of claim 4 wherein the network address comprises a Media Access Control (MAC) address of the remote network device.

6. The method of claim 1 wherein the step of detecting includes the steps of receiving a packet on the second port of the multiport network device and extracting the network address from the packet.

7. The method of claim 4 wherein the step of detecting includes the step of accessing the address lookup table to identify the first port as being associated with the network address of the remote network device.

8. The method of claim 1 wherein the step of detecting includes the steps of initiating an interrupt notification to a processor, and executing an interrupt service routine within the processor responsive to the interrupt notification.

9. The method of claim 1 including the step of indicating the reception, of the network address on the second port utilizing a global variable associated with the second port.

10. The method of claim 9 including the step of cycling through a plurality of global variables, each associated with a respective one of a plurality of ports of the multiport network device, and adjusting the sensitivity of at least one of a plurality of receivers associated with the plurality of ports in accordance with an indication provided by at least one global variable.

11. The method of claim 1 including the step of determining whether a network coupled to the second port is a predetermined network type.

12. The method of claim 11 including the step of determining whether the network coupled to the second port is implemented over Plain Old Telephone (POTS) wiring.

13. The method of claim 4 including the step of deleting the network address from the address lookup table responsive to the reception thereof on the second port of the multiport network address.

14. The method of claim 1 wherein the multiport network device comprises a switch.

15. A method of adjusting the sensitivity of a receiver, the method including the steps of:
   detecting reception of the network address, identifying a remote network device, on a port of the multiport network device;
   determining whether the network address is associated with a further port of the multiport network device; and
   if so, then automatically adjusting the sensitivity of a receiver, associated with the port, from a first level of sensitivity to a second level of sensitivity.

16. The method of claim 15 wherein the step of automatically adjusting the sensitivity includes the step of automatically raising a noise threshold level by a predetermined increment to decrease the sensitivity of the receiver associated with the port.

17. The method of claim 15 including the steps of determining whether the second level of sensitivity of the receiver exceeds a minimum sensitivity level and, if so, then retaining the first level of sensitivity for the receiver.

18. The method of claim 15 including the step of determining includes the step of accessing address lookup information that records respective associations between network addresses of remote devices and ports of the multiport network device.

19. The method of claim 15 including the step of retaining the first level of sensitivity of the receiver associated with port if the network address is not associated with the further port of the multiport network device.

20. Apparatus for adjusting the sensitivity of a receiver, the apparatus including:
   a memory to record an association of a network address of a remote network device with a first port of a multiport network device;
   a detector to detect reception of the network address on a second port of the multiport network device; and
   an adjuster, coupled to be detector, to automatically adjust the sensitivity of a receiver, associated with the second port, from a first level of sensitivity to a second level of sensitivity responsive to the reception of the network address on the second port.

21. The apparatus of claim 20 wherein the detector comprises an address lookup device.

22. The apparatus of claim 20 wherein the adjuster comprises a processor.

23. The apparatus of claim 20 wherein the adjuster automatically raises a noise threshold level by a predetermined increment to decrease the sensitivity of the receiver.

24. The apparatus of claim 20 wherein the adjuster determines whether the second level of sensitivity of the receiver exceeds a minimum sensitivity level and, if so, then retains the first level of sensitivity of the receiver.

25. The apparatus of claim 20 wherein the memory stores an address lookup table that records the association between the first port and the network address.

26. The apparatus of claim 20 wherein the network address comprises a Media Access Control (MAC) address of the remote network device.

27. The apparatus of claim 20 wherein the detector detects the reception of a packet on the second port of the multiport network device and extracts the network address from the packet.

28. The apparatus of claim 25 wherein the detector accesses the address lookup table to identify the first port as being associated with the network address of the remote network device.

29. The apparatus of claim 20 wherein the detector initiates an interrupt notification to adjuster and the adjuster executes an interrupt service routine within the adjuster responsive to the interrupt notification.

30. The apparatus of claim 20 wherein the adjuster indicates the reception of the network address on the second port utilizing a global variable associated with the second port.

31. The apparatus of claim 30 the adjuster cycles through a plurality of global variables, each associated with a respective one of a plurality of ports of the multiport network device, and adjusts the sensitivity of at least one of a plurality of receivers associated with the plurality of ports in accordance with an indication provided by at least one global variable.

32. The apparatus of claim 20 wherein the adjuster determines whether a network coupled to the second port is a predetermined network type.

33. The apparatus of claim 32 wherein the adjuster determines whether the network coupled to the second port is implemented over Plain Old Telephone (POTS) wiring.

34. The apparatus of claim 25 wherein the detector deletes the network address from the address lookup table responsive to the reception thereof on the second port of the multiport network address.

35. The apparatus of claim 20 wherein the multiport network device comprises a switch.

36. Apparatus for adjusting the sensitivity of a receiver, the apparatus comprising:
   detection means for detecting reception of the network address, identifying a remote network device, on a port of the multiport network device;
   determination means for determining whether the network address is associated with a further port of the multiport network device; and
   adjustment means for automatically adjusting the sensitivity of a receiver, associated with the port, from a first level of sensitivity to a second level of sensitivity responsive to the reception of the network address on the further port, if the network address is associated with the further port of the multiport network device.

37. The apparatus of claim 36 wherein adjustment means automatically raises a noise threshold level by a predetermined increment to decrease the sensitivity of the receiver associated with the port.

38. The apparatus of claim 36 wherein the adjustment means determines whether the second level of sensitivity of the receiver exceeds a minimum sensitivity level and, if so, then retains the first level of sensitivity for the receiver.

39. The apparatus of claim 36 wherein the determination means accesses address lookup information that records respective associations between network addresses of remote devices and ports of the multiport network device to determine whether the network address is associated with the further port of the multiport network device.

40. A machine-readable medium storing a sequence of instructions that, when executed by a machine, cause the machine to perform the steps of:
   detecting reception of the network address, associated with a first port, on a second port of a multiport network device; and
   automatically adjusting the sensitivity of a receiver, associated with the second port, from a first level of sensitivity to a second level of sensitivity responsive to the reception of the network address on the second port.

* * * * *